United States Patent
Kentor

[11] 3,853,999
[45] Dec. 10, 1974

[54] PROCESS FOR SHAPING COMMINUTED MEAT PRODUCTS

[75] Inventor: William E. Kentor, Highland Park, Ill.

[73] Assignee: Servbest Foods, Inc., Highland Park, Ill.

[22] Filed: Dec. 6, 1972

[21] Appl. No.: 312,659

[52] U.S. Cl............... 426/105, 141/114, 426/413, 426/512, 426/513
[51] Int. Cl............................................. A22c 18/00
[58] Field of Search ........... 426/245, 390, 282, 412, 426/413, 414, 512, 513, 105, 250, 102; 17/1 F, 33, 34, 35, 49; 53/24, 124; 99/349, 103; 100/176; 222/102; 141/114, 10

[56] References Cited
UNITED STATES PATENTS

| | | | |
|---|---|---|---|
| 2,070,850 | 2/1937 | Trabold | 99/349 |
| 2,107,851 | 2/1938 | Boehm | 426/250 |
| 2,138,462 | 11/1938 | Trabold | 426/412 X |
| 3,277,846 | 10/1966 | Kesselman | 99/450.2 |
| 3,507,669 | 4/1970 | Dhuysser et al. | 426/390 |

Primary Examiner—Hyman Lord
Attorney, Agent, or Firm—Hill, Gross, Simpson, Van Santen, Steadman, Chiara & Simpson

[57] ABSTRACT

Method for shaping a comminuted meat product which involves stuffing the comminuted meat into a casing which is closed at one end to less than the capacity of the casing, thereafter applying a shaping pressure about the stuffed meat to shape the periphery of the stuffed meat and force excess meat toward the open end of the casing, closing the open end of the casing tightly against the thus formed mass, and thereafter heating the meat within the casing to cause coagulation of the meat product by means of protein denaturation.

3 Claims, 6 Drawing Figures

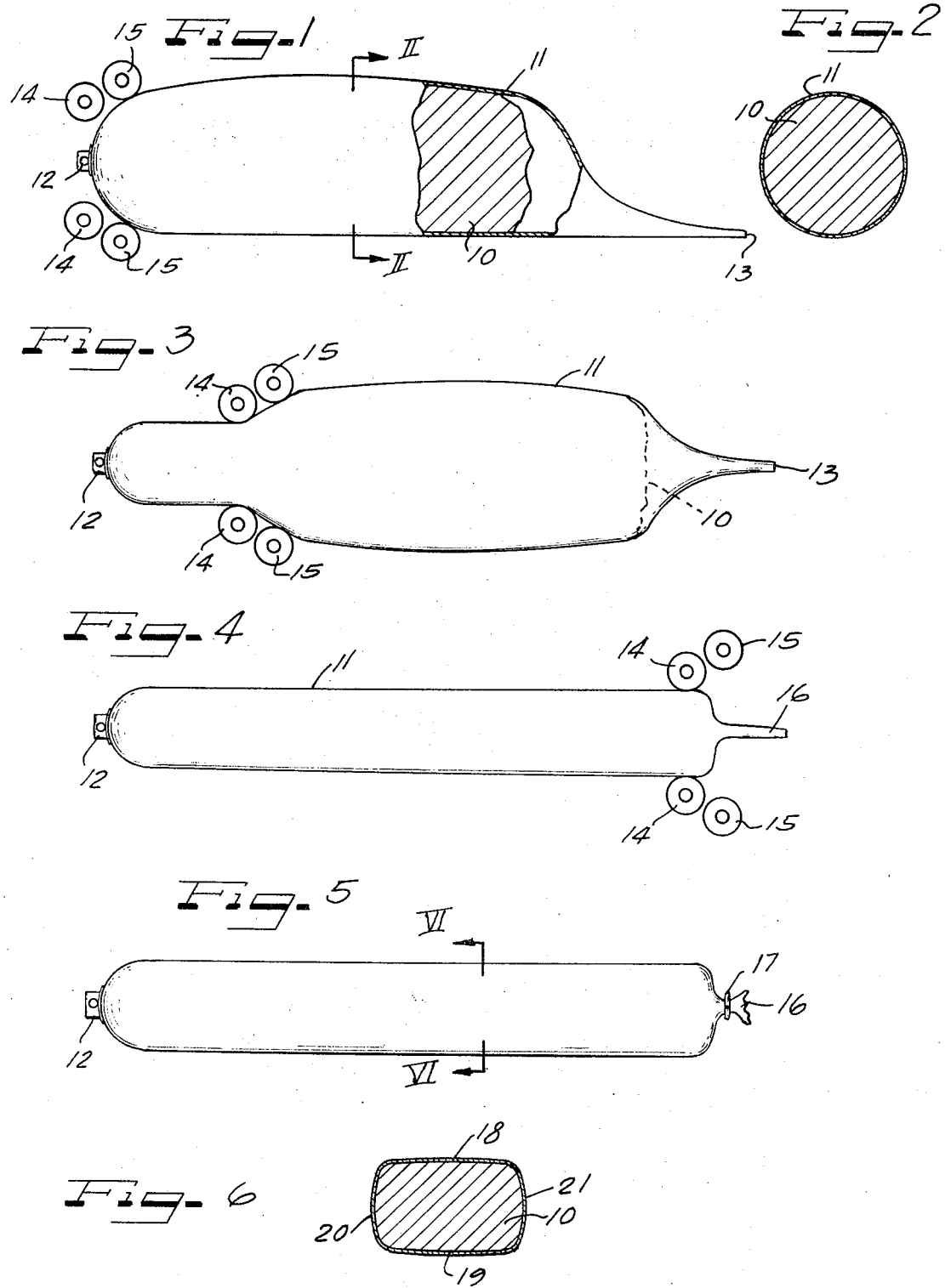

PROCESS FOR SHAPING COMMINUTED MEAT PRODUCTS

BACKGROUND OF THE INVENTION

1. Field of the Invention

This invention is in the field of shaping meat products into shapes other than cylindrical to improve the heat transfer characteristics of the shaped mass and to provide a more aesthetic appearance. The shaping and subsequent coagulation take place strictly under the influence of heat, with no extraneous binding agent being required.

2. Description of the Prior Art

At the present time, the only shape that can be economically formed on comminuted meat products encased in a plastic film is a cylindrical shape. The design of existing casings and processing equipment dictates that the cylindrical shape be used. When another shape is desired, such as an elliptical, rectangular or square shape, there are two methods which can conveniently be used. For one, the meat can be placed in suitably shaped metal molds while the meat is heated by means of water baths, hot air, or other suitable heating means. The coagulation of the meat during the heating process solidifies the meat mass so that after cooling, the shaped mass can be removed from the mold. This procedure suffers from the disadvantage of the high cost of molds, high labor cost in handling, and requires a costly cleaning procedure after each use.

A second method of shaping comminuted meat is to lower the temperature below 32°F. so that a rigid mass is obtained which roughly conforms to the cavity of a metal press. The press exerts sufficient pressure to deform the rigid mass into the desired shape. This technique suffers from the objections that expensive installation is required and costly refrigeration is needed to freeze the meat mass. The high cost of the mechanical press and the high labor cost involved are also two deterring features.

SUMMARY OF THE INVENTION

The process of the present invention can be operated at room temperature or at normal refrigerated packing house temperatures. It involves first stuffing a casing which has one closed end less than full with comminuted meat particles, the casing being relatively flexible but not relatively stretchable, i.e., it is relatively non-elastic. The comminuted meat mass which can be injected into the casing by conventional stuffing machines is still quite plastic and is capable of being extruded. Forming pressure is then applied to two or more sides of the cylindrical casing to reduce the dimensions of the mass in the direction of application of pressure. Lateral movement of the mass between the pressure application zones is prevented by the confinement provided by the inelastic nature of the casing in which the mass is contained, or separate mechanical pressure applying means may be employed to restrain such lateral movement. The plastic nature of the mass causes the excess comminuted meat, due to the reduction in cross-sectional area, to be exuded toward the open end of the casing. When the entire length of the mass has been shaped, there is still open space available toward the open end of the casing. This open end is then closed by means of suitable devices such as clips or the like, whereupon the comminuted shaped mass is heated to cause coagulation of the mass by protein denaturation, which usually involves heating the mass until the temperature is on the order of at least 120°F. The resulting product can then be cooled and removed from the casing or shipped in the casing as desired. While extraneous binders can be used in connection with this process, they are not necessary since the natural coagulation of the meat under these conditions is sufficient to provide a firm product which can be sliced.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic view of a casing which has been partially stuffed with comminuted meat as it exists prior to the shaping operation;

FIG. 2 is a cross-sectional view taken substantially along the line II—II;

FIG. 3 is a view similar to FIG. 1 but illustrating the condition of the mass as the pressure application continues;

FIG. 4 is a view similar to FIGS. 1 and 3 but illustrates the condition of the mass as pressure application is being completed;

FIG. 5 is a view similar to FIGS. 1, 3 and 4, but illustrating the shaped mass ready for solidification by heat; and FIG. 6 is a cross-sectional view taken substantially along the line VI—VI of FIG. 5.

DESCRIPTION OF THE PREFERRED EMBODIMENTS

In FIG. 1, there is illustrated a mass 10 of comminuted meat prepared by chopping, grinding, or flaking according to well known procedures. The comminuted meat 10 is stuffed into a casing 11 having one end closed by means of a clip 12 and having an open end designated at reference numeral 13. The casing 10 is composed of a flexible but substantially non-elastic material, in other words, a material that can be readily folded and handled on automatic handling equipment but which does not have significant elasticity. Parchment casings or synthetic resin casings such as those composed of polyethylene, polypropylene, polyvinyl alcohol, polyvinyl chloride, or acrylic sheet materials can be used. The mass 10 is stuffed into the casing 11 to an extent of about 60 to 85 percent of the volume which the casing 11 will hold. By means of the stuffing procedure, the meat mass 10 is fairly firm but is still capable of plastic flow, i.e., it can be extruded and reshaped by the application of pressure.

The leading end of the thus stuffed casing 11 is then passed between pairs of driven rollers 14 and 15 at different elevations, the rollers 14 being arranged to initially contact the leading end of the mass to initiate the backward movement of the plastic meat mass 10, and the rollers 15 continue the pressing operation progressively as illustrated in FIG. 3. Initially, the mass 10 and the casing 11 have a circular cross-section, as illustrated in FIG. 2.

The partially filled casing 11 is drawn through the rollers 14 and 15 until the entire mass has been reshaped as illustrated in FIG. 4 and the excess comminuted meat has been moved to partially fill the previously open end of the casing 11. At this stage, there is still enough unoccupied volume in the casing 11 to provide a closable end portion 16. This end portion is then closed snugly against the shaped meat mass by means of a clip 17.

As the meat is being shaped by the action of the rollers 14 and 15, lateral movement of the meat mass is restrained by the non-elastic nature of the casing 11. If desired, additional restraining means such as a pair of vertical rollers (not shown) can be used to engage the side edges of the mass as it is being formed by the rollers 14 and 15.

The particular embodiment of the invention illustrated in the drawings is employed to make a meat product which has two flat sides and curved side edges. It should be understood, of course, that various shapes can be made in this procedure, depending upon the nature of the rollers. Such rollers may be cylindrical, truncated, curved or irregularly shaped. The rollers can be symmetrical or have complementary shapes, such as complementary male and female parts. Instead of being mounted on parallel axes as illustrated in the drawings, the rollers can also be at axes which are angular with respect to each other.

The next step in the process consists in setting the shape of the meat and for that purpose, the encased meat is placed horizontally in a heated oven, a water bath, an oil bath or other conventional heating apparatus and heated within its casing until coagulation by protein denaturation is achieved. Normally, this involves maintaining a temperature of between about 120°F. and 212°F. in the heating environment until the internal temperature of the meat reaches at least 120°F. During the heating, there is no significant loss of moisture content, due to the impermeable nature of the casing. The product may then be cooled and removed from the casing 11 or shipped while still in the casing.

The configuration of the finished mass is illustrated in the cross-sectional view of FIG. 6. The central mass 10, as seen in that Figure is confined in a casing having parallel flat sides 18 and 19, and arcuately shaped sides 20 and 21.

The following specific examples illustrate particular applications of the process of the present invention.

EXAMPLE 1

Pieces of ground boneless pork were passed through a 1 inch grinder and mixed with salt, water, flavorings, and optionally, with other normal commercial ingredients. The mixed mass was stuffed through a commercial air stuffer into a fibrous casing of approximately 5 inch diameter and 25 inches in length such that the filled amount occupied 18 inches of the length. The leading end of the casing was previously clipped so that the meat mass was firmly packed against the leading end. After removal from the stuffer, the encased meat was placed between parallel rollers of approximately 2 inches in diameter which were spaced 3 inches apart. The meat was restricted on both sides by the casing and was displaced backward into the open end of the casing as the 3 inch height was obtained between the rollers. The displaced meat filled approximately 4 inches of the open casing. After the encased mass had traversed between the rollers, a clip was mechanically applied to seal the open end of the casing. The shaped mass was placed in a water bath at 160°F. for approximately 4 hours until an internal temperature of 150°F. was reached. The cooked encased meat was chilled until its internal temperature was 40°F., whereupon the casing was removed. The general shape of the mass was elliptical and resembled a boneless pork loin. The cooked shape was sliced on a commercial slicer to produce slices having the general appearance of an expensive cut of boneless defatted cooked pork.

EXAMPLE 2

A boneless brisket of beef was defatted and cut into chunks of approximately 1 pound size. These chunks were cured in the traditional commercial manner by adding salt, nitrates and nitrites in the approved amounts. After overnight curing, the product was ground through a 1 inch plate and was transported to a commercial mixer-blender where spices were added. The cured, ground, seasoned brisket was transferred to a commercial air stuffer and was stuffed into a plastic casing of high heat resistant qualities measuring about 5 inches in diameter and 25 inches in length. The front end of the casing was closed by a clip and was subsequently filled with 9 pounds of meat which left about 6 inches of unfilled casing at the rearward end. The casing was shaped by hand while lying on the table so that the top and two sides generally conformed to the shape of a brisket. The shaping process pushed the meat backward in the casing so that the meat eventually filled approximately 23 inches of the length of the casing. The casing was then snugly closed against the shaped mass. The encased mass was placed on a rack in a water tank containing 160°F. water until an internal temperature of 147°F. was reached in the meat. The hot water was removed from the tank and replaced by cold water. After the cooked product could be comfortably handled, it was removed to a cool area where an internal temperature of 40°F. was achieved. The casing was removed and the product was sliced to produce slices of cured, fully cooked corned beef which had the appearance of the traditional high-priced brisket of corned beef.

The process of the present invention not only improves the appearance of the comminuted meat but by virtue of the reshaping, it improves the heat transfer characteristics of the mass for heating and cooling purposes.

It should be evident that various modifications can be made to the described embodiments without departing from the scope of the present invention.

I claim as my invention:

1. A method for shaping a comminuted meat product which comprises stuffing comminuted meat into the closed end of an initially cylindrical casing having one closed end and an open end, said casing being composed of relatively flexible non-stretchable material, said casing being less than completely filled by the stuffed material, applying a rolling pressure about the stuffed meat on opposite sides of said casing to shape the periphery of the stuffed meat into a shape including at least two parallel flat sides and force excess meat toward said open end, closing the open end of the casing after such shaping and thereafter heating the meat within the casing until a meat temperature of at least 120°F. is reached.

2. The method of claim 1 in which said casing is composed of parchment.

3. The method of claim 1 in which said casing is composed of a resinous film.

* * * * *